(12) United States Patent
Fuller et al.

(10) Patent No.: US 9,790,862 B2
(45) Date of Patent: Oct. 17, 2017

(54) FUEL MANIFOLD AND FUEL INJECTOR ARRANGEMENT FOR A COMBUSTION CHAMBER

(71) Applicant: ROLLS-ROYCE PLC, London (GB)

(72) Inventors: Simon Leslie Fuller, Derby (GB); Liam Thomas Anthony Fretwell, Nottingham (GB)

(73) Assignee: ROLLS-ROYCE plc, London (GB)

( * ) Notice: Subject to any disclaimer, the term of this patent is extended or adjusted under 35 U.S.C. 154(b) by 370 days.

(21) Appl. No.: 14/687,594

(22) Filed: Apr. 15, 2015

(65) Prior Publication Data
US 2015/0322862 A1    Nov. 12, 2015

(30) Foreign Application Priority Data

May 7, 2014    (GB) .................................. 1408058.4

(51) Int. Cl.
*F02C 1/00*    (2006.01)
*F02C 7/22*    (2006.01)

(52) U.S. Cl.
CPC ........ *F02C 7/222* (2013.01); *F05D 2230/642* (2013.01); *F05D 2240/35* (2013.01);
(Continued)

(58) Field of Classification Search
CPC .... F02C 7/22; F02C 7/222; F02C 7/20; F23R 3/50; F23R 3/343
See application file for complete search history.

(56) References Cited

U.S. PATENT DOCUMENTS

| 4,862,693 A | 9/1989 | Batakis et al. |
| 5,211,005 A | 5/1993 | Hovnanian |

(Continued)

FOREIGN PATENT DOCUMENTS

| EP | 2341231 A2 | 7/2011 |
| GB | 1225961 A | 3/1971 |

(Continued)

OTHER PUBLICATIONS

Aug. 31, 2015 Search Report issued in European Patent Application No. 15163616.

(Continued)

*Primary Examiner* — Gerald L Sung
(74) *Attorney, Agent, or Firm* — Oliff PLC (57) ABSTRACT

Each fuel injector has a main nozzle and pilot nozzle. A main fuel manifold to supply fuel to the main nozzle of each fuel injector and pilot fuel manifold to supply fuel to the pilot nozzle of each fuel injector. The main fuel manifold includes plurality of flexible main fuel pipes. Also, plurality of cross-piece connectors including a stem and four arms. The stem of each connector mounted on one fuel injector. The first and third arms extend in opposite directions from the stem and second and fourth arms extend in opposite directions from the stem. Each fuel pipe interconnects the first arm of one connector with a third arm of an adjacent connector and each connector so the first and third arms are at an angle relative perpendicular to the axis of the annular combustion chamber casing so the main fuel manifold extends around the combustion chamber casing sinusoidally.

21 Claims, 7 Drawing Sheets

(52) U.S. Cl.
CPC .... *F05D 2250/184* (2013.01); *F05D 2250/75* (2013.01); *F05D 2300/501* (2013.01); *F05D 2300/50212* (2013.01)

(56) References Cited

U.S. PATENT DOCUMENTS

| | | | |
|---|---|---|---|
| 5,263,314 A | 11/1993 | Anderson | |
| 5,701,732 A * | 12/1997 | Nesbitt | F02C 7/232 60/39.094 |
| 2003/0056578 A1* | 3/2003 | Mitchell | F01D 21/003 73/112.01 |
| 2008/0072605 A1* | 3/2008 | Hagen | F23R 3/34 60/776 |
| 2010/0071663 A1 | 3/2010 | Patel et al. | |
| 2011/0154824 A1* | 6/2011 | Fiebig | F02C 7/222 60/739 |
| 2013/0152590 A1* | 6/2013 | Kojovic | F23R 3/20 60/739 |
| 2014/0102112 A1* | 4/2014 | Jewess | F01D 15/10 60/776 |

FOREIGN PATENT DOCUMENTS

| | | |
|---|---|---|
| JP | 2013108436 A | 6/2013 |
| WO | 2013/192523 A1 | 12/2013 |

OTHER PUBLICATIONS

Nov. 21, 2014 Search Report issued in British Application No. GB1408058.4.

\* cited by examiner

FUEL MANIFOLD AND FUEL INJECTOR ARRANGEMENT FOR A COMBUSTION CHAMBER

FIELD OF THE INVENTION

The present disclosure relates to an arrangement for supplying fuel to a combustion chamber and in particular to a fuel manifold and fuel injector arrangement for a combustion chamber, more particularly to a fuel manifold and fuel injector arrangement for a gas turbine engine combustion chamber.

BACKGROUND TO THE INVENTION

Currently an annular combustion chamber of a gas turbine engine has a number of fuel injectors arranged to supply fuel into the annular combustion chamber. Each fuel injector includes a fuel feed arm which extends generally radially from the annular combustion chamber and through a corresponding aperture in a combustion chamber casing surrounding the annular combustion chamber. Each fuel injector has a pilot fuel nozzle and a main fuel nozzle. An annular main fuel manifold extends circumferentially around the combustion chamber casing and is arranged to supply fuel to the main fuel nozzle of each of the fuel injectors. Two pilot fuel manifolds extend circumferentially around the combustion chamber casing and together are arranged to supply fuel to the main fuel nozzle of each of the fuel injectors. An annular additional fuel manifold extends circumferentially around the combustion chamber casing and is arranged to supply fuel to each of the fuel injectors. The annular fuel manifold is supported from the combustion chamber casing at a number of circumferentially spaced locations by brackets arranged to prevent vibration of the manifold during operation of the gas turbine engine.

Each fuel injector is connected to the annular main fuel manifold by an associated main fuel supply pipe. Each fuel injector is connected to one of the pilot fuel manifolds by an associated pilot fuel supply pipe and each fuel injector is connected to the annular additional fuel manifold by an associated additional fuel supply pipe. Each main fuel supply pipe is connected at a first end to a T-connector on the annular fuel manifold and is connected at a second end to a radially outer end of the feed arm of the fuel injector. Each pilot fuel supply pipe is connected at a first end to a T-connector on one of the pilot fuel manifolds and is connected at a second end to a radially outer end of the feed arm of the fuel injector. Each additional fuel supply pipe is connected at a first end to a T-connector on the annular additional fuel manifold and is connected at a second end to a radially outer end of the feed arm of the fuel injector. The main fuel supply pipes, the pilot fuel supply pipes and the additional fuel supply pipes are rigid and are arranged in a generally S-shaped path from the respective fuel manifold to the fuel injector.

In this arrangement the main fuel supply pipes, the pilot fuel supply pipes and the additional fuel supply pipes are rigid and delicate and occasionally suffer from denting of the fuel pipes, cracking of welds and consequential leakage of fuel. The rigid main fuel supply pipes, the pilot fuel supply pipes and the additional fuel supply pipes also suffer from vibrations. In addition the assembling of the annular main fuel manifold, main fuel supply pipes, pilot fuel manifolds, pilot fuel supply pipes, annular additional fuel manifold, additional fuel supply pipes and fuel injectors into a fully interlocking and sealing alignment is time consuming and costly and similarly the repairing or replacing of a fuel injector and/or fuel pipe is costly and time consuming. This arrangement requires many components e.g. fuel pipes, connectors, brackets, fasteners, seals etc.

Therefore the present disclosure seeks to provide a novel fuel manifold and fuel injector arrangement for a combustion chamber which reduces or overcomes the above mentioned problem.

STATEMENTS OF INVENTION

Accordingly the present disclosure provides a fuel manifold and fuel injector arrangement for supplying fuel to at least one combustion chamber comprising an annular combustion chamber casing arranged around the at least one combustion chamber, a plurality of circumferentially spaced fuel injectors arranged to supply fuel into the at least one combustion chamber, each fuel injector having a main fuel nozzle and a pilot fuel nozzle, a main fuel manifold arranged to supply fuel to the main fuel nozzle of each of the fuel injectors, at least one pilot fuel manifold arranged to supply fuel to the pilot fuel nozzle of each of the fuel injectors, each fuel injector having a fuel feed arm extending through a corresponding aperture in the annular combustion chamber casing, the main fuel manifold comprising a plurality of flexible main fuel pipes, the arrangement further comprising a plurality of first connectors, each first connector comprising a stem and at least three arms, the stem of each first connector being mounted on an outer end of a respective one of the fuel feed arms, the first and third arms extending in opposite directions from the stem, the second arm extending from the stem, each flexible main fuel pipe interconnecting the first arm of one first connector with a third arm of an adjacent first connector, each first connector being arranged such that the first and third arms are arranged at an angle relative to a plane perpendicular to the axis of the annular combustion chamber casing such that the main fuel manifold extends around the combustion chamber casing sinusoidally, and the second arm of each first connector being connected to the pilot fuel manifold.

The fuel manifold and fuel injector arrangement may further comprise an additional fuel manifold arranged to supply fuel to the main fuel nozzle of each of the fuel injectors, each first connector comprising a stem and four arms, the second and fourth arms extending in opposite directions from the stem, and the fourth arm of each first connector being connected to the additional fuel manifold.

Each first connector may be arranged such that the first and third arms are arranged at an angle relative to a plane containing the axis of the annular combustion chamber casing and at an angle relative to a plane perpendicular to the axis of the annular combustion chamber casing and adjacent first connectors being arranged at opposite angles such that the fuel manifold extends around the combustion chamber casing sinusoidally.

The first and third arms of the first connectors may be arranged at an angle of 10° to 90° to the plane perpendicular to the axis of the annular combustion chamber casing.

The first and third arms of the first connectors may be arranged at an angle of 30° to 60° to the plane perpendicular to the axis of the annular combustion chamber casing.

All of the first connectors may be arranged such that the first and third arms are arranged at an angle of the same magnitude.

The first connectors may be arranged such that the first and third arms are arranged at angles of different magnitudes.

All of the first connectors may be arranged such that the first and third arms are arranged at an angle of 45° to the plane containing the axis of the annular combustion chamber casing and at an angle of 45° to the plane perpendicular to the axis of the annular combustion chamber casing.

The parallel first and third arms of the first connector may be arranged coaxially.

The pilot fuel manifold may comprise a plurality of flexible pilot fuel pipes and a plurality of second connectors, each second connector comprising a stem and two arms, the stem of each second connector being connected to a second arm of a respective one of the first connectors, the arms extending in opposite directions from the stem, each flexible pilot fuel pipe interconnecting the arm of one second connector with an arm of an adjacent second connector.

Each second connector may be arranged such that the arms are arranged at an angle relative to a plane perpendicular to the axis of the annular combustion chamber casing such that the pilot fuel manifold extends around the combustion chamber casing sinusoidally.

The additional fuel manifold may comprise a plurality of flexible additional fuel pipes and a plurality of third connectors, each third connector comprising a stem and two arms, the stem of each third connector being connected to a fourth arm of a respective one of the first connectors, the arms extending in opposite directions from the stem, each flexible additional fuel pipe interconnecting the arm of one third connector with an arm of an adjacent third connector.

Each third connector may be arranged such that the arms are arranged at an angle relative to a plane perpendicular to the axis of the annular combustion chamber casing such that the additional fuel manifold extends around the combustion chamber casing sinusoidally.

Each first connector may be a cross-piece connector. Each cross-piece connector may be a cruciform shaped connector or an X shaped connector.

Each second connector may be a T connector. Each third connector may be a T connector.

The at least one combustion chamber may be an annular combustion chamber.

The at least one combustion chamber may be a gas turbine engine combustion chamber.

The gas turbine engine may be an aero gas turbine engine, a marine gas turbine engine or an industrial gas turbine engine.

The present disclosure also provides a fuel manifold and fuel injector arrangement for supplying fuel to at least one combustion chamber comprising an annular combustion chamber casing arranged around the at least one combustion chamber, a plurality of circumferentially spaced fuel injectors arranged to supply fuel into the at least one combustion chamber, each fuel injector having a main fuel nozzle and a pilot fuel nozzle, a main fuel manifold arranged to supply fuel to the main fuel nozzle of each of the fuel injectors, at least one pilot fuel manifold arranged to supply fuel to the pilot fuel nozzle of each of the fuel injectors, an additional fuel manifold arranged to supply fuel to the main fuel nozzle of each of the fuel injectors, each fuel injector having a fuel feed arm extending through a corresponding aperture in the annular combustion chamber casing, the main fuel manifold comprising a plurality of flexible main fuel pipes, the arrangement further comprising a plurality of cross-piece connectors, each cross-piece connector comprising a stem and four arms, the stem of each cross-piece connector being mounted on an outer end of a respective one of the fuel feed arms, the first and third arms extending in opposite directions from the stem, the second and fourth arms extending in opposite directions from the stem, each flexible main fuel pipe interconnecting the first arm of one cross-piece connector with a third arm of an adjacent cross-piece connector, each cross-piece connector being arranged such that the first and third arms are arranged at an angle relative to a plane perpendicular to the axis of the annular combustion chamber casing such that the main fuel manifold extends around the combustion chamber casing sinusoidally, the second arm of each cross-piece connector being connected to the pilot fuel manifold and the fourth arm of each cross-piece connector being connected to the additional fuel manifold.

Each cross-piece connector may be arranged such that the first and third arms are arranged at an angle relative to a plane containing the axis of the annular combustion chamber casing and at an angle relative to a plane perpendicular to the axis of the annular combustion chamber casing and adjacent cross-piece connectors being arranged at opposite angles such that the fuel manifold extends around the combustion chamber casing sinusoidally.

The first and third arms of the cross-piece connectors may be arranged at an angle of 10° to 90° to the plane perpendicular to the axis of the annular combustion chamber casing. The first and third arms of the cross-piece connectors may be arranged at an angle of 0° to 80° to the plane containing the axis of the annular combustion chamber casing.

The first and third arms of the cross-piece connectors may be arranged at an angle of 15° to 75° to the plane perpendicular to the axis of the annular combustion chamber casing. The first and third arms of the cross-piece connectors may be arranged at an angle of 15° to 75° to the plane containing the axis of the annular combustion chamber casing.

The first and third arms of the cross-piece connectors may be arranged at an angle of 30° to 60° to the plane perpendicular to the axis of the annular combustion chamber casing. The first and third arms of the cross-piece connectors may be arranged at an angle of 30° to 60° to the plane containing the axis of the annular combustion chamber casing.

All of the cross-piece connectors may be arranged such that the first and third arms are arranged at an angle of the same magnitude. Alternatively the cross-piece connectors may be arranged such that the first and third arms are arranged at angle of different magnitudes.

All of the cross-piece connectors being arranged such that the first and third arms are arranged at an angle of 45° to the plane containing the axis of the annular combustion chamber casing and at an angle of 45° to the plane perpendicular to the axis of the annular combustion chamber casing.

The parallel first and third arms of the cross-piece connector may be arranged coaxially.

The pilot fuel manifold may comprise a plurality of flexible pilot fuel pipes and a plurality of T connectors, each T connector comprising a stem and two arms, the stem of each T connector being connected to a second arm of a respective one of the cross-piece connectors, the arms extending in opposite directions from the stem, each flexible pilot fuel pipe interconnecting the arm of one T connector with an arm of an adjacent T connector.

Each T connector may be arranged such that the arms are arranged at an angle relative to a plane perpendicular to the axis of the annular combustion chamber casing such that the pilot fuel manifold extends around the combustion chamber casing sinusoidally.

The additional fuel manifold may comprise a plurality of flexible additional fuel pipes and a plurality of T connectors, each T connector comprising a stem and two arms, the stem of each T connector being connected to a fourth arm of a respective one of the cross-piece connectors, the arms extending in opposite directions from the stem, each flexible additional fuel pipe interconnecting the arm of one T connector with an arm of an adjacent T connector.

Each T connector may be arranged such that the arms are arranged at an angle relative to a plane perpendicular to the axis of the annular combustion chamber casing such that the additional fuel manifold extends around the combustion chamber casing sinusoidally.

The stem of the cross-piece connector being circular in cross-section, the fuel feed arm being circular in cross-section and the stem of the cross-piece connector and the fuel feed arm being arranged coaxially.

The present disclosure also provides a fuel manifold and fuel injector arrangement for supplying fuel to at least one combustion chamber comprising an annular combustion chamber casing arranged around the at least one combustion chamber, a plurality of circumferentially spaced fuel injectors arranged to supply fuel into the at least one combustion chamber, each fuel injector having a main fuel nozzle and a pilot fuel nozzle, a main fuel manifold arranged to supply fuel to the main fuel nozzle of each of the fuel injectors, at least one pilot fuel manifold arranged to supply fuel to the pilot fuel nozzle of each of the fuel injectors, each fuel injector having a fuel feed arm extending through a corresponding aperture in the annular combustion chamber casing, the main fuel manifold comprising a plurality of flexible main fuel pipes, the arrangement further comprising a plurality of cross-piece connectors, each cross-piece connector comprising a stem and three arms, the stem of each cross-piece connector being mounted on an outer end of a respective one of the fuel feed arms, the first and third arms extending in opposite directions from the stem, the second arms extending from the stem, each flexible main fuel pipe interconnecting the first arm of one cross-piece connector with a third arm of an adjacent cross-piece connector, each cross-piece connector being arranged such that the first and third arms are arranged at an angle relative to a plane perpendicular to the axis of the annular combustion chamber casing such that the main fuel manifold extends around the combustion chamber casing sinusoidally, and the second arm of each cross-piece connector being connected to the pilot fuel manifold.

Each cross-piece connector may be arranged such that the first and third arms are arranged at an angle relative to a plane containing the axis of the annular combustion chamber casing and at an angle relative to a plane perpendicular to the axis of the annular combustion chamber casing and adjacent cross-piece connectors being arranged at opposite angles such that the fuel manifold extends around the combustion chamber casing sinusoidally.

The first and third arms of the cross-piece connectors may be arranged at an angle of 10° to 90° to the plane perpendicular to the axis of the annular combustion chamber casing.

The first and third arms of the cross-piece connectors may be arranged at an angle of 30° to 60° to the plane perpendicular to the axis of the annular combustion chamber casing.

All of the cross-piece connectors may be arranged such that the first and third arms are arranged at an angle of the same magnitude.

The cross-piece connectors may be arranged such that the first and third arms are arranged at angles of different magnitudes.

All of the cross-piece connectors may be arranged such that the first and third arms are arranged at an angle of 45° to the plane containing the axis of the annular combustion chamber casing and at an angle of 45° to the plane perpendicular to the axis of the annular combustion chamber casing.

The parallel first and third arms of the cross-piece connector may be arranged coaxially.

The pilot fuel manifold may comprise a plurality of flexible pilot fuel pipes and a plurality of T connectors, each T connector comprising a stem and two arms, the stem of each T connector being connected to a second arm of a respective one of the cross-piece connectors, the arms extending in opposite directions from the stem, each flexible pilot fuel pipe interconnecting the arm of one T connector with an arm of an adjacent T connector.

Each T connector may be arranged such that the arms are arranged at an angle relative to a plane perpendicular to the axis of the annular combustion chamber casing such that the pilot fuel manifold extends around the combustion chamber casing sinusoidally.

The at least one combustion chamber may be an annular combustion chamber. The at least one combustion chamber may comprise a plurality of tubular combustion chamber arranged in a tubo-annular arrangement.

The combustion chamber may be a gas turbine engine combustion chamber.

The gas turbine engine may be an aero gas turbine engine, a marine gas turbine engine or an industrial gas turbine engine.

BRIEF DESCRIPTION OF THE DRAWINGS

The present invention will be more fully described by way of example with reference to the accompanying drawings, in which:—

DETAILED DESCRIPTION

Figure 1:
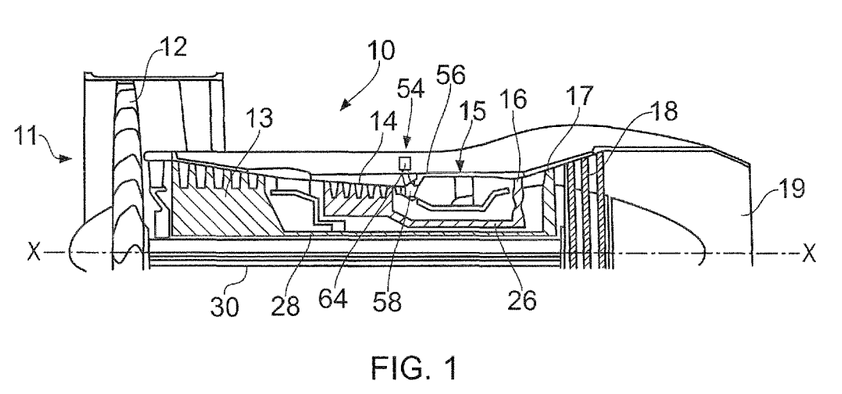
FIG. 1 is partially cut away view of a turbofan gas turbine engine having a fuel manifold and fuel injector arrangement for a combustion chamber according to the present disclosure.

A turbofan gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

Figure 2:
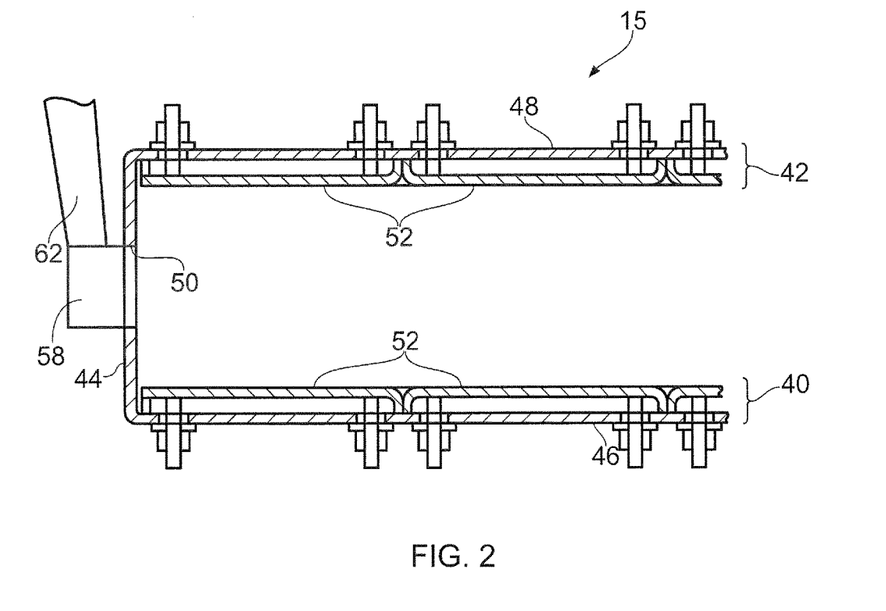
FIG. 2 is an enlarged cross-sectional view through the combustion chamber shown in FIG. 1.

The combustion chamber 15, as shown more clearly in FIG. 2, is an annular combustion chamber and comprises a radially inner annular wall structure 40, a radially outer annular wall structure 42 and an upstream end wall structure 44. The radially inner annular wall structure 40 comprises a first annular wall 46. The radially outer annular wall structure 42 comprises a second annular wall 48. The upstream end of the first annular wall 46 is secured to the upstream end wall structure 44 and the upstream end of the second annular wall 48 is secured to the upstream end wall structure 44. In this example the radially inner annular wall structure 40 also comprises a number of tiles 52 secured to the first annular wall 46 and the radially outer annular wall structure 42 also comprises a number of tiles 52 secured to the second annular wall 48. The upstream end wall structure 44 has a plurality of circumferentially spaced apertures 50 and each aperture 50 has a respective one of a plurality of fuel injectors 58 located therein. The fuel injectors 58 are arranged to supply fuel into the annular combustion chamber 15 during operation of the gas turbine engine 10. The fuel injectors 58 are lean burn fuel injectors and comprise a main fuel nozzle and a pilot fuel nozzle. The pilot fuel nozzle of each fuel injector 58 is positioned radially within the main fuel nozzle of the fuel injector 58. The main fuel nozzle of each fuel injector 58 is positioned radially between inner and outer main air swirlers and the pilot fuel nozzle of each fuel injector 58 is positioned radially between inner and outer pilot air swirlers. The pilot fuel nozzle has a pilot fuel prefilmer and the main fuel nozzle has a main fuel prefilmer. The fuel injectors 58 are arranged to operate in two different modes of operation, depending on the particular operating conditions, e.g. the particular part of a flight cycle, of the gas turbine engine. In a first mode of operation pilot fuel only is supplied to the pilot fuel nozzle of each fuel injector 58. In a second mode of operation pilot fuel is supplied to the pilot fuel nozzle of each fuel injector 58 and main fuel is supplied to the main fuel nozzle of each fuel injector 58.

A fuel manifold and fuel injector arrangement 54 for a combustion chamber 15 according to the present disclosure is shown more clearly in FIGS. 3 to 7. The combustion chamber 15 is an annular combustion chamber and an annular combustion chamber casing 56 is arranged generally coaxially around the annular combustion chamber 15. The annular combustion chamber casing 56 has a flange 55 at an upstream end and a flange 57 at a downstream end which are fastened to an adjacent compressor casing (not shown) and an adjacent turbine casing (not shown) respectively via suitable fasteners, e.g. nuts, bolts and washers. A plurality of circumferentially spaced fuel injectors 58 are arranged to supply fuel into the annular combustion chamber 15. Each fuel injector 58 has a fuel feed arm 62 extending through a corresponding one of a plurality of circumferentially spaced apertures 64 in the annular combustion chamber casing 56. Each fuel feed arm 62 is located in an associated sealing plate 65 which is secured onto the annular combustion chamber casing 56 by suitable fasteners, e.g. bolts. The fuel injectors 58 and apertures 64 are equi-circumferentially spaced around the annular combustion chamber casing 56.

Figure 3:
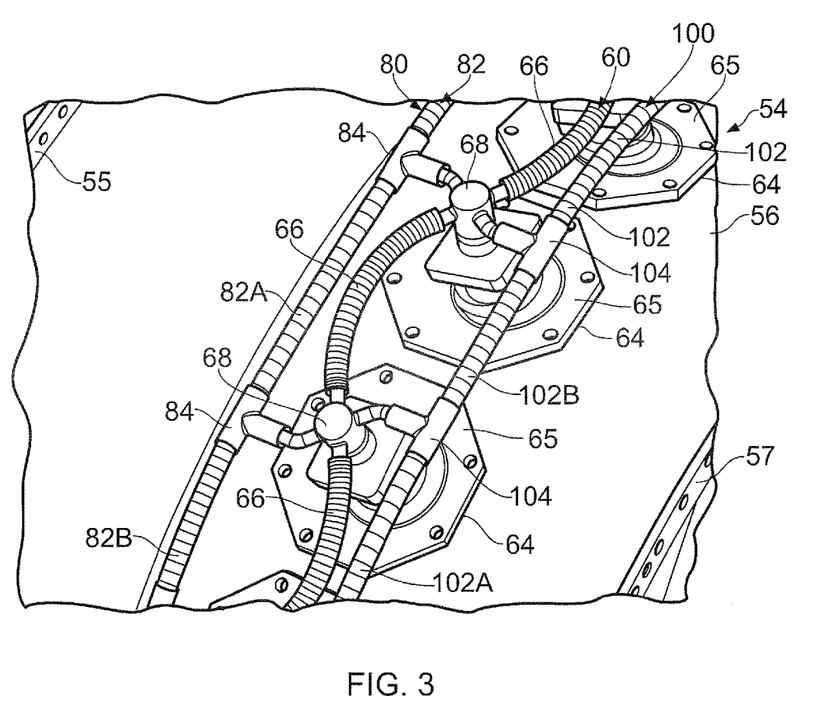
FIG. 3 is an enlarged perspective view of a fuel manifold and fuel injector arrangement for a combustion chamber according to the present disclosure and shown in FIG. 1.
Figure 4:
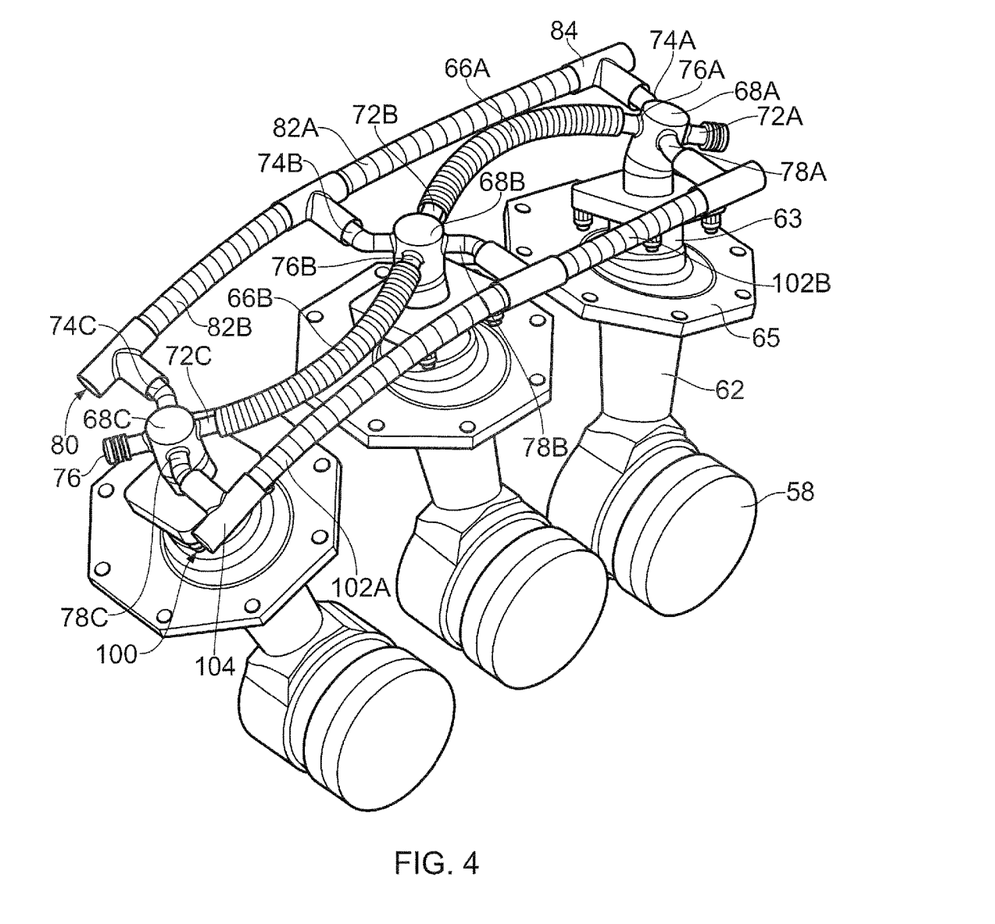
FIG. 4 is a further enlarged perspective view of a fuel manifold and fuel injector arrangement for a combustion chamber according to the present disclosure and shown in FIG. 1.
Figure 5:
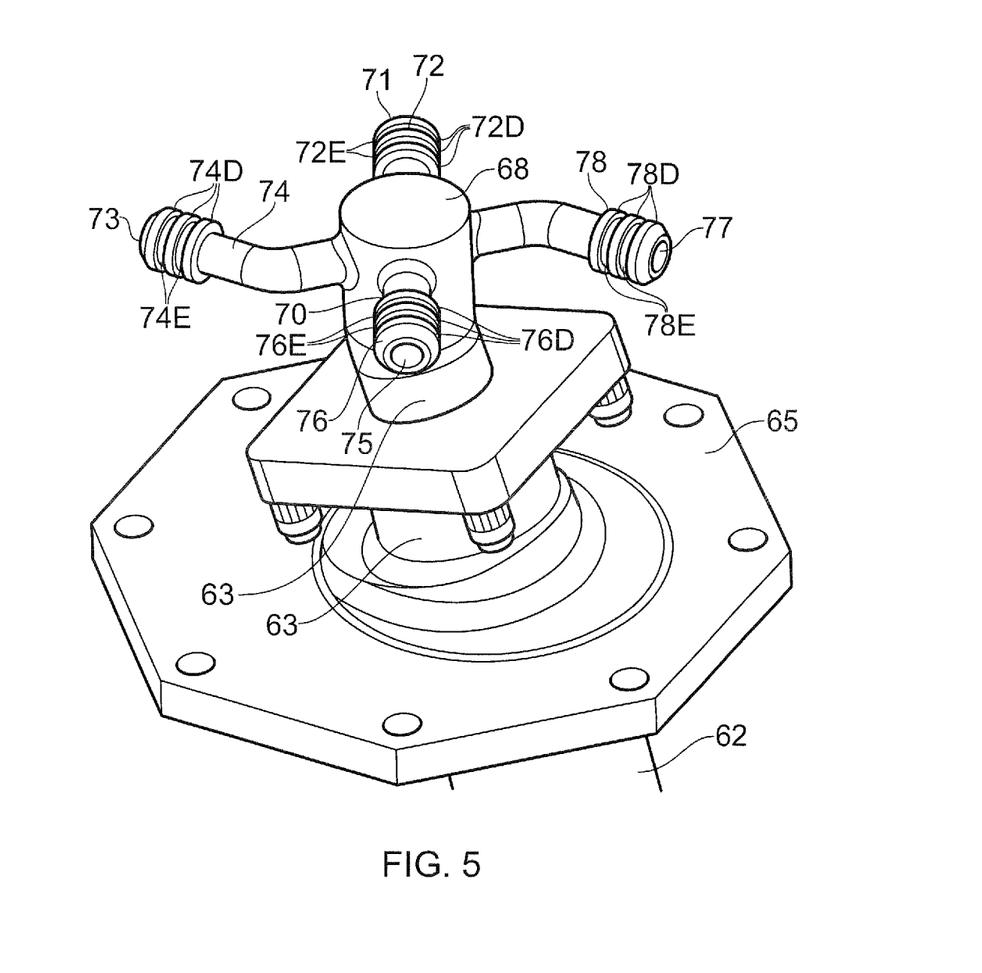
FIG. 5 is an enlarged perspective view of a cross-piece connector used in the fuel manifold and fuel injector arrangement for a combustion chamber according to the present disclosure shown in FIGS. 3 and 4.
Figure 6:
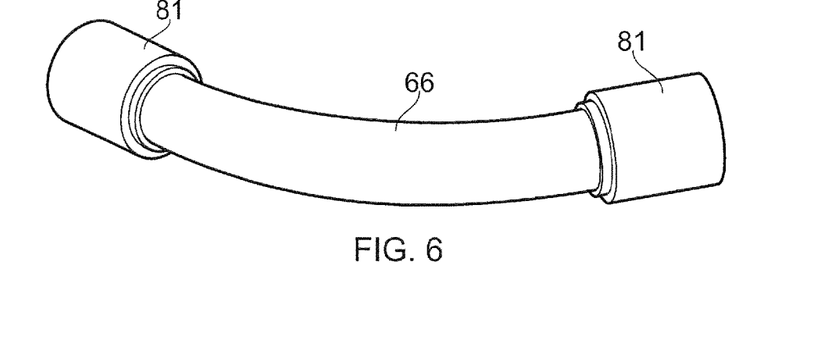
FIG. 6 is an enlarged perspective view of a fuel pipe used in the main fuel manifold, the pilot fuel manifold and the additional fuel manifold of the fuel manifold and fuel injector arrangement for a combustion chamber according to the present disclosure shown in FIGS. 3 and 4.

A main fuel manifold 60 is arranged to supply main fuel to each of the fuel injectors 58 and the main fuel manifold 60 comprises a plurality of flexible fuel pipes 66 and a plurality of first connectors, cross-piece connectors, 68 as shown in FIGS. 3, 4 and 5. A pilot fuel manifold 80 is arranged to supply pilot fuel to each of the fuel injectors 58 and the pilot fuel manifold 80 comprises a plurality of flexible fuel pipes 82, a plurality of second connectors, T connectors, 84 and the plurality of first connectors, cross-piece connectors, 68 as shown in FIGS. 3, 4 and 5. An additional fuel manifold 100 is arranged to supply main fuel to each of the fuel injectors 58 and the additional fuel manifold 100 comprises a plurality of flexible fuel pipes 102, a plurality of third connectors, T connectors, 104 and the plurality of first connectors, cross-piece connectors, 68.

Each cross-piece connector 68, as shown more clearly in FIG. 5, comprises a stem 70 and four arms 72, 74, 76 and 78. The first and third arms 72 and 76 extend in opposite directions from the stem 70. The second and fourth arms 74 and 78 extend in opposite directions from the stem 70. The stem 70 and the arms 72, 74, 76 and 78 of each cross-piece connector 68 are hollow and the arms 72, 74, 76 and 78 have fuel passages 71, 73, 75 and 77 respectively for the flow of fuel, as shown in FIG. 5. The stem 70 of each cross-piece connector 68 is mounted on an outer end 63 of a respective one of the fuel feed arms 62. It is to be noted that the second and third arms 74 and 78 are cranked, curved, but the second and third arms 74 and 78 are cranked in opposite directions so that they remain extending in opposite directions.

One of the flexible fuel pipes 66 of the main fuel manifold 60 interconnects a first arm 72 of one cross-piece connector 68 with a third arm 76 of an adjacent cross-piece connector 68. The main fuel is supplied along and through each flexible fuel pipe 66 and into the first arm 72 of a cross-piece connector 68 and some of the main fuel is supplied through the stem 70 of the cross-piece connector 68 into and through the fuel feed arm 62 to the main fuel nozzle of the associated fuel injector 58 and the remainder of the main fuel is supplied through the third arm 76 of the cross-piece connector 68 into the next flexible fuel pipe 66 to be delivered to the adjacent cross-piece connector 68 and the fuel feed arm 62 and main fuel nozzle of the associated fuel injector 58. Each flexible fuel pipe 66 comprises a braided hose capable of operating at high temperatures and capable of tolerating thermal expansion of the gas turbine engine components and tolerating vibrations of the gas turbine engine. Each flexible fuel pipe 66 comprises several coaxial layers for example an inner polytetrafluoroethylene (PTFE) layer, a braided layer, an insulation layer and an outer braided layer. The braided layer is a pressure containing layer, the insulation layer may comprise a fibrous material and the outer braided layer is a protective layer. However, other suitable flexible fuel pipes which are capable of operating in a zone temperature of at least 300° C. may be used.

Thus, it is seen in FIG. 4 that the three consecutive cross-piece connectors 68A, 68B and 68C are arranged such that the third arm 76A and the first arm 72B of the cross-piece connectors 68A and 68B face in an upstream direction but face in opposite circumferential directions and towards each other. The arms 76B and 72C of the cross-piece connectors 68B and 68C face in a downstream direction but face in opposite circumferential directions and towards each other. The interconnecting flexible fuel pipe 66A is arcuate and its ends are connected to the arms 76A and 72B of the cross-piece connectors 68A and 68B respectively. The flexible fuel pipe 66A initially extends from the arm 76A of the cross-piece connector 68A with components in an upstream direction and a circumferential direction to a position where it reaches a maximum upstream position and then the flexible fuel pipe 66A extends with components in a downstream direction and a circumferential direction to the arm 72B of the cross-piece connector 68B. The flexible fuel pipe 66B initially extends from the arm 76B of the cross-piece connector 68B with components in a downstream direction and a circumferential direction to a position where it reaches a maximum downstream position and then the flexible fuel pipe 66B extends with components in an upstream direction and a circumferential direction to the arm 72C of the cross-piece connector 68C. Thus, the main fuel manifold 60 is sinusoidal in that the flexible fuel pipes 66 and cross-piece connectors 68 are arranged such that the main fuel manifold 60 extends sequentially between alternate positions of maximum upstream position and downstream direction circumferentially around the annular combustion chamber casing 56.

Figure 7:
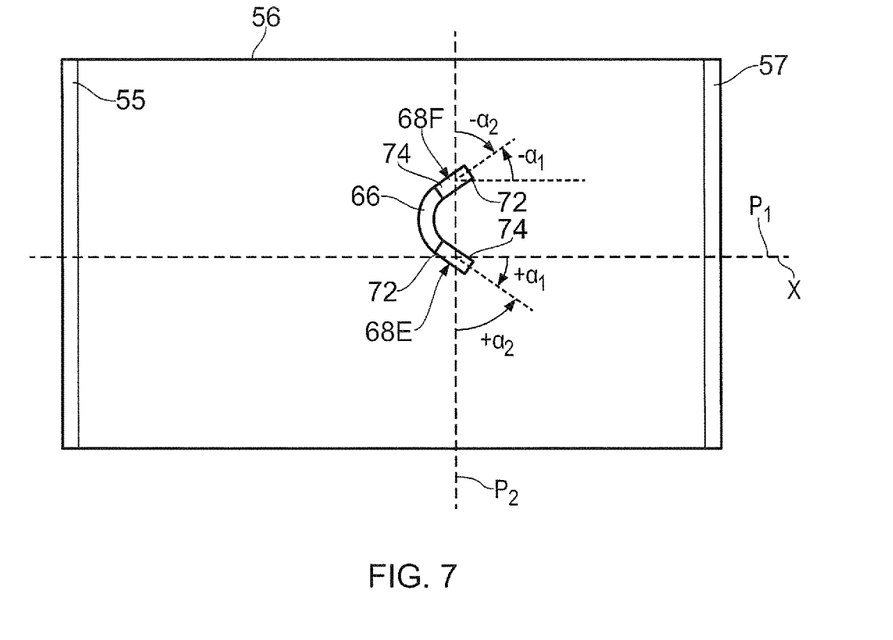
FIG. 7 is a plan view of the fuel manifold and fuel injector arrangement for a combustion chamber shown in FIG. 1.

Each cross-piece connector 68E, 68F is arranged such that the first and third arms 72 and 74 are arranged at an angle $\alpha_1$ relative to a plane $P_1$ containing the axis X of the annular combustion chamber casing 56, and also the axes of the annular combustion chamber 15 and the gas turbine engine 10, and at an angle $\alpha_2$ to a plane $P_2$ perpendicular to the axis X of the annular combustion chamber casing 56, and also the axes of the annular combustion chamber 15 and the gas turbine engine 10, as shown in FIG. 7. In addition adjacent cross-piece connectors 68 are arranged at opposite angles, for example the first and third arms 72 and 76 of T piece connector 68E define an angle of $+\alpha_1$ and $+\alpha_2$ with the planes $P_1$ and $P_2$ respectively whereas the first and third arms 72 and 76 of the adjacent cross-piece connector 68F define angles $-\alpha_1$ and $-\alpha_2$ with the planes $P_1$ and $P_2$ respectively such that the main fuel manifold 60 extends around the combustion chamber casing 56 sinusoidally.

The first and third arms 72 and 76 of the cross-piece connectors 68 are typically arranged an angle $\alpha_2$ of 15° to 75° to the plane $P_2$ perpendicular to the axis X of the annular combustion chamber casing 56. The first and third arms 72 and 76 of the cross-piece connectors 68 may be arranged more broadly at an angle $\alpha_2$ of 10° to 90° to the plane $P_2$ perpendicular to the axis X of the annular combustion chamber casing 56. The first and third arms 72 and 76 of the cross-piece connectors 68 are preferably arranged at an angle $\alpha_2$ of 30° to 60° to the plane $P_2$ perpendicular to the axis X of the annular combustion chamber casing 56. It is preferred that all of the cross-piece connectors 68 are arranged such that the first and third arms 72 and 76 are arranged at an angle $\alpha_2$ of the same magnitude. In this example all of the cross-piece connectors 68 are arranged such that the first and third arms 72 and 76 are arranged at an angle $\alpha_1$ of 45° to the plane $P_1$ containing the axis X of the annular combustion chamber casing 56 and at an angle $\alpha_2$ of 45° to the plane $P_2$ perpendicular to the axis X of the annular combustion chamber casing 56. The parallel first and third arms 72 and 76 of the cross-piece connector 68 are arranged coaxially in this example.

Alternatively the cross-piece connectors 68 may be arranged such that the first and third arms 72 and 76 are arranged at angles $\alpha_2$ of different magnitudes. The cross-piece connectors 68 may be arranged such that the first and third arms 72 and 76 are parallel but the first and third arms 72 and 76 are at different longitudinal positions, different radial positions with respect to the annular combustion chamber casing 56, on the stem 70. The cross-piece connectors 68 may be arranged such that the first and third arms 72 and 76 are parallel and are at the same longitudinal position, same radial position, but the first and third arms 72 and 74 are at different lateral positions, e.g. are arranged side by side. The cross-piece connectors 68 may be arranged such that the first and third arms 72 and 76 are parallel, but the first and third arms 72 and 76 are at different radial positions with respect to the annular combustion chamber casing 56, on the stem 70 and the first and third arms 72 and 76 are at different lateral positions.

The radially outer ends 63 of the fuel feed arms 62 are circular in cross-section and the stems 70 of the cross-piece connectors 68 are circular in cross-section and the stems 70 of the cross-piece connectors 68 locate on and sealingly engage with the radially outer ends 63 of the fuel feed arms 63 to supply fuel into the respective fuel injectors 58. Similarly the arms 72 and 76 of the cross-piece connectors 68 are circular in cross-section and the ends of the flexible fuel pipes 66 are circular in cross-section and the first and third arms 72 and 76 of the cross-piece connectors 68 locate on and sealingly engage with the ends of the flexible fuel pipes 66. Each end of a flexible fuel pipe 66 extends through a respective lock nut 81. The lock nuts 81 are threaded on their internal surfaces and the ends of the flexible fuel pipes 66 are threaded on their external surfaces such that the ends of the flexible fuel pipes 66 are threaded into the lock nuts 81 and located onto the first and third arms 72 and 76 of the adjacent cross-piece connectors 68 to hold the flexible fuel pipe 66 securely to the respective cross-piece connector 68. The first and third arms 72 and 76 of each cross-piece connector 68 have ridges 72D and 76D respectively which define annular grooves 72E and 76E to receive O-ring seals (not shown). The O-ring seals form a seal between the first and third arms 72 and 76 and the inner surfaces of the ends of the flexible fuel pipes 68. Thrust wire locks (not shown) are also provided to hold the ends of the flexible fuel pipes 68 onto the cross-piece connectors 68. However, it may be possible to locate and seal the ends of the flexible fuel pipes 68 on the cross-piece connectors 68 using other suitable connectors. It is equally possible to use cross-piece connectors 68 which have arms 72 and 76 and flexible fuel pipes 66 with other cross-sectional shapes.

The pilot fuel manifold 80 comprises a plurality of flexible fuel pipes 82 and a plurality of T piece connectors 84 arranged alternately. There are two different lengths of flexible fuel pipe 82A and 82B to interconnect adjacent T piece connectors 82. Each flexible fuel pipe 82 interconnects two adjacent T piece connectors 84. The second arm 74 of each cross-piece connector 68 is connected to a respective one of the T piece connectors 84. The pilot fuel is supplied along and through each flexible fuel pipe 82 into a T connector 84. Some of the pilot fuel is supplied through the second arm 74 of the associated cross-piece connector 68, through the stem 70 of the cross-piece connector 68 into and through the fuel feed arm 62 to the pilot fuel nozzle of the associated fuel injector 58. The remainder of the pilot fuel is supplied through the T piece connector 84 into the next flexible fuel pipe 82 to be delivered to the adjacent T piece connector 84, the associated connector 68 and the fuel feed arm 62 and pilot fuel nozzle of the associated fuel injector 58.

Each flexible fuel pipe 82 comprises a braided hose capable of operating at high temperatures and capable of tolerating thermal expansion of the gas turbine engine components and tolerating vibrations of the gas turbine engine. Each flexible fuel pipe 82 comprises several coaxial layers for example an inner polytetrafluoroethylene (PTFE) layer, a braided layer, an insulation layer and an outer braided layer. The braided layer is a pressure containing layer, the insulation layer may comprise a fibrous material and the outer braided layer is a protective layer. However, other suitable flexible fuel pipes which are capable of operating in a zone temperature of at least 300° C. may be used.

Thus, it is seen in FIG. 4 that the three consecutive cross-piece connectors 68A, 68B and 68C are arranged such that the second arms 74A, 74B and 74C of the cross-piece connectors 68A, 68B and 68C face in an upstream direction. The second arms 74A and 74B face in opposite circumferential directions and face away from each other. The second arms 74B and 74C also face in opposite circumferential directions but face towards each other. The T connectors 84 associated with the second arms 74A and 74B of the cross-piece connectors 68A and 68B respectively are spaced further circumferentially apart than the T connectors 84 associated with the second arms 74B and 74C of the cross-piece connectors 68B and 68C respectively. Thus, the flexible fuel pipes 82A interconnecting the T connectors 84 associated with the second arms 74A and 74B of the cross-piece connectors 68A and 68B is longer than the flexible fuel pipe 82B interconnecting the T connectors 84 associated with the second arms 74B and 74C of the cross-piece connectors 68B and 68C.

The ends of the flexible fuel pipes 82 are connected to the T connectors 84 and the stem of the T connectors 84 are connected to the second arms 74 of the cross-piece connectors 68A and 68B. Thus, the pilot fuel manifold 80 extends substantially with a circumferential component around, and thus is arranged generally coaxially around, the combustion chamber casing 56.

The second arms 74 of the cross-piece connectors 68 are typically arranged an angle $\alpha_2$ of 15° to 75° to the plane $P_2$ perpendicular to the axis X of the annular combustion chamber casing 56. The second arms 74 of the cross-piece connectors 68 may be arranged more broadly at an angle $\alpha_2$ of 10° to 90° to the plane $P_2$ perpendicular to the axis X of the annular combustion chamber casing 56. The second arm 74 of the cross-piece connectors 68 are preferably arranged at an angle $\alpha_2$ of 30° to 60° to the plane $P_2$ perpendicular to the axis X of the annular combustion chamber casing 56. It is preferred that all of the cross-piece connectors 68 are arranged such that the second arms 74 are arranged at an angle $\alpha_2$ of the same magnitude. In this example all of the cross-piece connectors 68 are arranged such that the second arms 74 are arranged at an angle $\alpha_1$ of 45° to the plane $P_1$ containing the axis X of the annular combustion chamber casing 56 and at an angle $\alpha_2$ of 45° to the plane $P_2$ perpendicular to the axis X of the annular combustion chamber casing 56.

The second arms 72 of the cross-piece connectors 68 are circular in cross-section and the stems of the T connectors are circular in cross-section and the second arms 72 of the cross-piece connectors 68 locate on and sealingly engage with the stems of the T connectors 84. The ends of the flexible fuel pipes 82 are circular in cross-section and the arms of the T piece connectors 84 are circular in cross-section and the arms of the T piece connectors 84 locate on and sealingly engage with the ends of the flexible fuel pipes 82. Each end of a flexible fuel pipe 82 extends through a respective lock nut (not shown). The lock nuts are threaded on their internal surfaces and the ends of the flexible fuel pipes 82 are threaded on their external surfaces such that the ends of the flexible fuel pipes 82 are threaded into the lock nuts and located onto the arms of the adjacent T piece connectors 84 to hold the flexible fuel pipe 82 securely to the respective T piece connector 84. The second arm 74 of each cross-piece connector 68 has ridges 74D which define annular grooves 74E to receive O-ring seals (not shown). The O-ring seals form a seal between the second arm 74 and the inner surface of the stem of the associated T piece connector 84. Thrust wire locks (not shown) are also provided to hold the ends of the flexible fuel pipes 82 onto the T piece connectors 84. However, it may be possible to locate and seal the ends of the flexible fuel pipes 82 on the T piece connectors 84 using other suitable connectors. It is equally possible to use T piece connectors 84 and flexible fuel pipes 82 with other cross-sectional shapes.

The additional fuel manifold 100 comprises a plurality of flexible fuel pipes 102 and a plurality of T piece connectors 104 arranged alternately. There are two different lengths of flexible fuel pipe 102A and 102B to interconnect adjacent T piece connectors 104. Each flexible fuel pipe 102 interconnects two adjacent T piece connectors 104. The fourth arm 74 of each cross-piece connector 68 is connected to a respective one of the T piece connectors 104. The main fuel is supplied along and through each flexible fuel pipe 102 to a T connector 104. Some of the main fuel is supplied through the fourth arm 78 of the associated cross-piece connector 68, through the stem 70 of the cross-piece connector 68 into and through the fuel feed arm 62 to the main fuel nozzle of the associated fuel injector 58. The remainder of the main fuel is supplied through the T piece connector 104 into the next flexible fuel pipe 102 to be delivered to the adjacent T piece connector 104, the associated connector cross-piece 68 and the fuel feed arm 62 and main fuel nozzle of the associated fuel injector 58.

Each flexible fuel pipe 102 comprises a braided hose capable of operating at high temperatures and capable of tolerating thermal expansion of the gas turbine engine components and tolerating vibrations of the gas turbine engine. Each flexible fuel pipe 102 comprises several coaxial layers for example an inner polytetrafluoroethylene (PTFE) layer, a braided layer, an insulation layer and an outer braided layer. The braided layer is a pressure containing layer, the insulation layer may comprise a fibrous material and the outer braided layer is a protective layer. However, other suitable flexible fuel pipes which are capable of operating in a zone temperature of at least 300° C. may be used.

Thus, it is seen in FIG. 4 that the three consecutive cross-piece connectors 68A, 68B and 68C are arranged such that the fourth arms 78A, 78B and 78C of the cross-piece connectors 68A, 68B and 68C face in a downstream direction. The fourth arms 78A and 78B face in opposite circumferential directions and face towards each other. The second arms 78B and 78C also face in opposite circumferential directions but face away from each other. The T connectors 104 associated with the fourth arms 78B and 78C of the cross-piece connectors 68B and 68C respectively are spaced further circumferentially apart than the T connectors 84 associated with the second arms 74A and 74B of the cross-piece connectors 68A and 68B respectively. Thus, the flexible fuel pipes 102A interconnecting the T connectors 84 associated with the second arms 78B and 78C of the cross-piece connectors 68B and 68C is longer than the flexible fuel pipe 102B interconnecting the T connectors 84 associated with the second arms 74A and 74B of the cross-piece connectors 68A and 68B.

The ends of the flexible fuel pipes 102 are connected to the T connectors 104 and the stem of the T connectors 104 are connected to the fourth arms 74 of the cross-piece connectors 68A and 68B. Thus, the additional fuel manifold 100 extends substantially with a circumferential component around, and thus is arranged generally coaxially around, the combustion chamber casing 56.

The fourth arms 78 of the cross-piece connectors 68 are typically arranged an angle $\alpha_2$ of 15° to 75° to the plane $P_2$ perpendicular to the axis X of the annular combustion chamber casing 56. The fourth arms 78 of the cross-piece connectors 68 may be arranged more broadly at an angle $\alpha_2$ of 10° to 90° to the plane $P_2$ perpendicular to the axis X of the annular combustion chamber casing 56. The fourth arm 78 of the cross-piece connectors 68 are preferably arranged at an angle $\alpha_2$ of 30° to 60° to the plane $P_2$ perpendicular to the axis X of the annular combustion chamber casing 56. It is preferred that all of the cross-piece connectors 68 are arranged such that the fourth arms 78 are arranged at an angle $\alpha_2$ of the same magnitude. In this example all of the cross-piece connectors 68 are arranged such that the fourth arms 78 are arranged at an angle $\alpha_1$ of 45° to the plane $P_1$ containing the axis X of the annular combustion chamber casing 56 and at an angle $\alpha_2$ of 45° to the plane $P_2$ perpendicular to the axis X of the annular combustion chamber casing 56.

The fourth arms 78 of the cross-piece connectors 68 are circular in cross-section and the stems of the T connectors 104 are circular in cross-section and the fourth arms 78 of the cross-piece connectors 68 locate on and sealingly engage with the stems of the T connectors 104. The ends of the flexible fuel pipes 102 are circular in cross-section and the arms of the T piece connectors 104 are circular in cross-section and the arms of the T piece connectors 104 locate on and sealingly engage with the ends of the flexible fuel pipes 102. Each end of a flexible fuel pipe 102 extends through a respective lock nut (not shown). The lock nuts are threaded on their internal surfaces and the ends of the flexible fuel pipes 102 are threaded on their external surfaces such that the ends of the flexible fuel pipes 102 are threaded into the lock nuts and located onto the arms of the adjacent T piece connectors 104 to hold the flexible fuel pipe 102 securely to the respective T piece connector 104. The fourth arm 78 of each cross-piece connector 68 has ridges 78D which define annular grooves 78E to receive O-ring seals (not shown). The O-ring seals form a seal between the fourth arm 74 and the inner surface of the stem of the associated T piece connector 104. Thrust wire locks (not shown) are also provided to hold the ends of the flexible fuel pipes 102 onto the T piece connectors 104. However, it may be possible to locate and seal the ends of the flexible fuel pipes 102 on the T piece connectors 104 using other suitable connectors. It is equally possible to use T piece connectors 84 and flexible fuel pipes 82 with other cross-sectional shapes.

As mentioned above the cross-piece connectors 68 are provided with fuel passages 71, 73, 75 and 77 in the arms 72, 74, 76 and 78 respectively, as shown in FIG. 5. The diameters of the fuel passages 71 and 75 in the first and third arms 72 and 76 of the cross-piece connectors 68 are substantially the same and the same as the diameter of the passage in the flexible fuel pipes 66. The fuel passages 71 and 75 in the first and third arms 72 and 76 of the cross-piece connectors 68 are aligned, preferably coaxial. The fuel passages 71 and 75 in each cross-piece connector 68 are connected to a main fuel passage (not shown) which extends through the stem of the cross-piece connector 68 to the main fuel passage in the associated fuel feed arm 62 to the main fuel nozzle of the fuel injector 58. The main fuel passage within the stem of each cross-piece connector 68 is provided with a weight distributor valve to control the flow of main fuel to the main fuel nozzle of the associated fuel injector 58. The fuel passage 73 in the second arm 74 of each cross-piece connector 68 is connected to a pilot fuel passage (not shown) which extends through the stem of the cross-piece connector 68 to the pilot fuel passage in the associated fuel feed arm 62 to the pilot fuel nozzle of the fuel injector 58. The pilot fuel passage within the stem of each cross-piece connector 68 is provided with a weight distributor valve to control the flow of pilot fuel to the pilot fuel nozzle of the associated fuel injector 58. The fuel passage 77 in the fourth arm 78 of each cross-piece connector 68 is also connected to the main fuel passage (not shown) which extends through the stem of the cross-piece connector 68 to the main fuel passage in the associated fuel feed arm 62 to the main fuel nozzle of the fuel injector 58.

The apertures 64 in the combustion chamber casing 56 are arranged substantially in the plane $P_2$ perpendicular to the axis X of the combustion chamber casing 56, combustion chamber 15 and turbofan gas turbine engine 10. The stems 70 of the cross-piece connectors 68 are also arranged substantially in the plane $P_2$ perpendicular to the axis X of the combustion chamber casing 56, combustion chamber 15 and turbofan gas turbine engine 10. Thus the stems 70 of the cross-piece connectors 68 are arranged at the "zero crossing points" of the sinusoidal main fuel manifold 60.

All the cross-piece connectors 68 are identical and all of the flexible fuel pipes 66 are identical and thus these components may be used interchangeably at any equivalent position. All of the T piece connectors 84 are identical and all of the T piece connectors 104 are identical and thus these components may be used interchangeably at any equivalent position. The flexible fuel pipes 82 have flexible fuel pipes 82A, 82B with two different lengths and the flexible fuel pipes 102 have flexible fuel pipes 102A, 102B with two different lengths.

During the first mode of operation, pilot only operation, of the fuel manifold and fuel injector arrangement 54 of the combustion chamber 15 of the gas turbine engine 10, pilot fuel is supplied from the pilot fuel manifold 80 to the pilot fuel nozzle of all the fuel injectors 58. In addition, during pilot only operation of the fuel manifold and fuel injector arrangement 54 of the combustion chamber 15 main fuel is supplied through the additional fuel manifold 100 to each fuel injector 58, but the main fuel is not supplied to the main fuel nozzles, and instead the main fuel is returned from each fuel injector 58 to the fuel supply, fuel tank, through the main fuel manifold 60. The main fuel supplied by the additional fuel manifold 100 has insufficient pressure to overcome the weight distributor valve in the main fuel passage within the stem of each cross-piece connector 68. The main fuel is supplied from the fuel supply, fuel tank, through the additional fuel manifold 100 and returned to the fuel supply, fuel tank, through the main fuel manifold 60 during the first mode of operation to reduce, or prevent, stagnation of the fuel within the main fuel manifold and/or additional fuel manifold in order to prevent coking of the fuel. During the second mode of operation, pilot and main operation, of the fuel manifold and fuel injector arrangement 54 of the combustion chamber 15 of the gas turbine engine 10, pilot fuel is supplied from the pilot fuel manifold 80 to the pilot fuel nozzle of all the fuel injectors 58. Also, during pilot and main operation main fuel is supplied through both the main fuel manifold 60 and the additional fuel manifold 100 to the main fuel nozzle of each fuel injector 58. The combination of the main fuel flow from the main fuel manifold 80 and the main fuel flow from the additional fuel manifold 100 is sufficient to overcome the weight distributor valve in the main fuel passage within the stem of each cross-piece connector 68.

The cross-piece connectors 68 control the pressure of the main fuel and pilot fuel in the associated fuel injector 58. The cross-piece connectors 68 enable the main fuel manifold 60, the pilot fuel manifold 80 and the additional fuel manifold 100 to be positioned around the combustion chamber casing within a confined axial dimension.

The cross-piece connectors 68 in combination with the T piece connectors 84 and 104 of the pilot fuel manifold 80 and the additional fuel manifold 100 enable the pilot fuel manifold 80 and the additional fuel manifold 100 to be quickly assembled onto the main fuel manifold 60 after the main fuel manifold 60 has been assembled or to be quickly unassembled off the main fuel manifold 60.

The pilot fuel manifold 80 may be preassembled by connecting the flexible fuel pipes 82 and T connectors 84 together and the additional fuel manifold 80 may be preassembled by connecting the flexible fuel pipes 102 and T connectors 104 together. The pilot fuel manifold 80, as a whole unit, is located upstream of the main fuel manifold 60 and arranged so that each T connector 84 is aligned with the second arm 74 of the associated cross-piece connector 68 and then the pilot fuel manifold 80 is moved axially downstream so that the T connectors 84 are assembled onto the second arm 74 of the associated cross-piece connectors 68. Similarly, the additional fuel manifold 100, as a whole unit, is located downstream of the main fuel manifold 60 and is arranged so that each T connector 104 is aligned with the fourth arm 78 of the associated cross-piece connector 68 and then the additional fuel manifold 100 is moved axially upstream so that the T connectors 104 are assembled onto the fourth arm 78 of the associated cross-piece connector 68. The pilot fuel manifold 80 and the additional fuel manifold 100 may either be a single annular fuel manifold or alternatively two half fuel manifolds.

Figure 8:
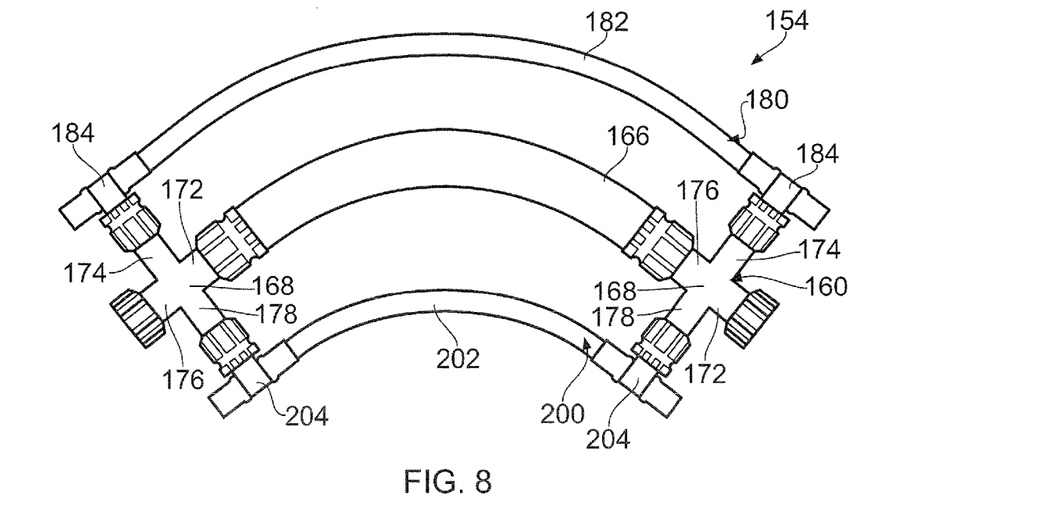
FIG. 8 is an enlarged plan view of a portion of another fuel manifold and fuel injector arrangement for a combustion chamber shown in FIG. 1.

A further fuel manifold and fuel injector arrangement 154 for a combustion chamber 15 according to the present disclosure is shown more clearly in FIG. 8. A main fuel manifold 160 is arranged to supply main fuel to each of the fuel injectors 58 and the main fuel manifold 160 comprises a plurality of flexible fuel pipes 166 and a plurality of first connectors, cross-piece connectors, 168 as shown in FIG. 8. A pilot fuel manifold 180 is arranged to supply pilot fuel to each of the fuel injectors 58 and the pilot fuel manifold 180 comprises a plurality of flexible fuel pipes 182, a plurality of second connectors, T connectors, 184 and the plurality of first connectors, cross-piece connectors, 168. An additional fuel manifold 200 is arranged to supply fuel to each of the fuel injectors 58 and the additional fuel manifold 200 comprises a plurality of flexible fuel pipes 202, a plurality of third connectors, T connectors, 204 and the plurality of first connectors, cross-piece connectors, 168. This arrangement is substantially the same as and operates in the same manner as that described with reference to FIGS. 3 to 7. Each cross-piece connector 168, as shown more clearly in FIG. 8, comprises a stem and four arms 172, 174, 176 and 178. The first and third arms 172 and 176 extend in opposite directions from the stem. The second and fourth arms 174 and 178 extend in opposite directions from the stem. The stem and the arms 172, 174, 176 and 178 of each cross-piece connector 168 are hollow and the arms 172, 174, 176 and 178 have fuel passages (not shown) respectively for the flow of fuel. The stem of each cross-piece connector 168 is mounted on an outer end 63 of a respective one of the fuel feed arms 62. It is to be noted that the second and third arms 174 and 178 are not cranked.

It is to be noted that the arms of each T piece connector 184 of the pilot fuel manifold 180 are arranged parallel with the first and third arms 172 and 176 of the associated cross-piece connector 168 of the main fuel manifold 160 and that the arms of each T piece connector 204 of the additional fuel manifold 200 are arranged parallel with the first and third arms 172 and 176 of the associated cross-piece connector 168 of the main fuel manifold 160. The arms of adjacent T piece connectors 184 are connected by an arcuate flexible fuel pipe 182 and the arms of adjacent T piece connectors 204 are connected by an arcuate flexible fuel pipe 202. Thus, each T piece connector 184 is arranged such that the arms are arranged at an angle relative to a plane perpendicular to the axis of the annular combustion chamber casing 56 such that the pilot fuel manifold 180 extends around the combustion chamber casing 56 sinusoidally. Thus, each T piece connector 204 is arranged such that the arms are arranged at an angle relative to a plane perpendicular to the axis of the annular combustion chamber casing 56 such that the additional fuel manifold 200 extends around the combustion chamber casing 56 sinusoidally.

The fuel manifold and fuel injector arrangement 154 differs from the fuel manifold and fuel injector arrangement 54 in that the pilot fuel manifold 180 and the additional fuel manifold 200 extend around the combustion chamber casing 56 sinusoidally and thus the main fuel manifold 160, the pilot fuel manifold 180 and the additional fuel manifold 200 are arranged substantially parallel to each other.

Figure 9:
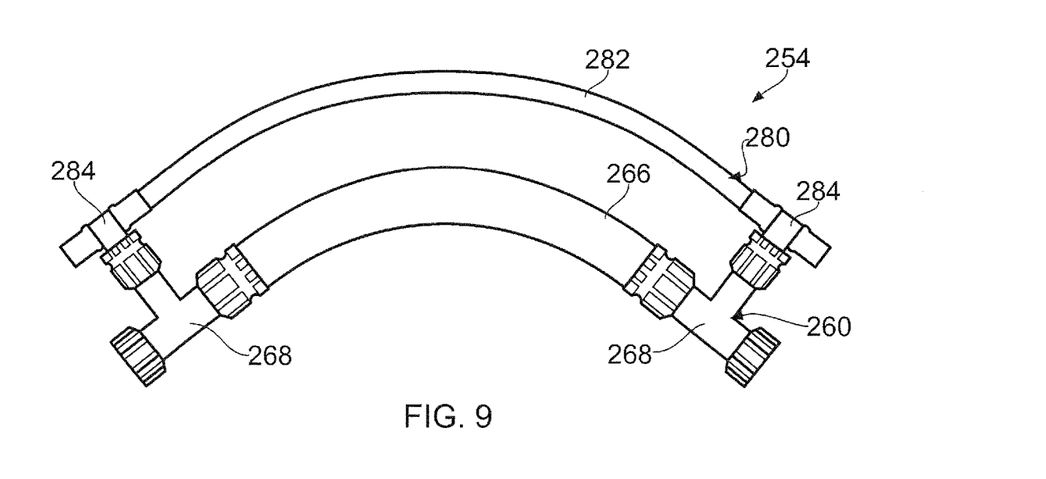
FIG. 9 is an enlarged plan view of a portion of a further fuel manifold and fuel injector arrangement for a combustion chamber shown in FIG. 1.

Another fuel manifold and fuel injector arrangement 254 for a combustion chamber 15 according to the present disclosure is shown more clearly in FIG. 9. A main fuel manifold 260 is arranged to supply main fuel to each of the fuel injectors 58 and the main fuel manifold 260 comprises a plurality of flexible fuel pipes 266 and a plurality of three armed connectors 268 as shown in FIG. 9. A pilot fuel manifold 280 is arranged to supply pilot fuel to each of the fuel injectors 58 and the pilot fuel manifold 280 comprises a plurality of flexible fuel pipes 282, a plurality of T connectors 284 and the plurality of three armed connectors 268. Each three armed connector 268, as shown more clearly in FIG. 9, comprises a stem and three arms 272, 274 and 276. The first and third arms 272 and 276 extend in opposite directions from the stem. The second arm 274 also extends from the stem. The stem and the arms 272, 274 and 276 of each three armed connector 268 are hollow and the arms 272, 274 and 276 have fuel passages (not shown) respectively for the flow of fuel. The stem of each three armed connector 268 is mounted on an outer end 63 of a respective one of the fuel feed arms 62. It is to be noted that the second arm 274 is not cranked.

It is to be noted that the arms of each T piece connector 284 of the pilot fuel manifold 280 are arranged parallel with the first and third arms 272 and 276 of the associated three armed connector 268 of the main fuel manifold 260. The arms of adjacent T piece connectors 284 are connected by an arcuate flexible fuel pipe 282. Thus, each T piece connector 284 is arranged such that the arms are arranged at an angle relative to a plane perpendicular to the axis of the annular combustion chamber casing 56 such that the pilot fuel manifold 280 extends around the combustion chamber casing 56 sinusoidally.

The fuel manifold and fuel injector arrangement 254 differs from the fuel manifold and fuel injector arrangement 54 in that the pilot fuel manifold 280 extends around the combustion chamber casing 56 sinusoidally and thus the main fuel manifold 160 and the pilot fuel manifold 180 are arranged substantially parallel to each other. In addition the fuel manifold and fuel injector arrangement 254 does not have an additional manifold.

The cross-piece connectors are preferably X shaped connectors or cruciform shaped connectors. Each cruciform shaped connector is arranged such that the first and third arms of the cross-piece connector are arranged parallel and coaxial, the second and fourth arms of the cross-piece connector are arranged parallel and coaxial and the first and third arms are arranged perpendicularly to the second and fourth arms. The four arms of each cruciform shaped connector are arranged in a common plane and the stem extends from the plane containing the arms of the cruciform shaped connector. Each X shaped connector is are arranged such that the first and third arms of the cross-piece connectors are arranged parallel and coaxial, the second and fourth arms of the cross-piece connectors are arranged parallel and coaxial but the first and third arms are not arranged perpendicularly to the second and fourth arms. The four arms of each X shaped connector are arranged in a common plane and the stem extends from the plane containing the arms of the X shaped connector. Each three armed connector is arranged such that the first and third arms of the three armed connector are arranged parallel and coaxial and the first and third arms are arranged perpendicularly to the second arm. The three arms of each three armed connector are arranged in a common plane and the stem extends from the plane containing the arms of the three armed connector.

Although the present invention has been described with reference to an annular combustion chamber, the present invention is also applicable to a combustion chamber arrangement comprising a plurality of circumferentially spaced tubular combustion chambers arranged in a tubo-annular arrangement or to a plurality of separate circumferentially spaced tubular combustion chambers arranged in an annulus.

Although the present invention has been described with reference to a gas turbine engine combustion chamber it may be applicable to other combustion chambers.

An advantage of the present disclosure is that the main fuel manifold is flexible and is able to accommodate differences in thermal expansion and contraction between the main fuel manifold and the annular combustion chamber casing. The main fuel manifold is flexible and is also able to accommodate vibration. The sinusoidal nature of the main fuel manifold, e.g. the combination of the arcuate flexible fuel pipes between the angled cross-piece connectors provide the main fuel manifold with this flexibility. Another advantage of the present disclosure is that in some arrangements the pilot fuel manifold is flexible and is able to accommodate differences in thermal expansion and contraction between the pilot fuel manifold and the annular combustion chamber casing. The pilot fuel manifold is flexible and is also able to accommodate vibration. The sinusoidal nature of the pilot fuel manifold, e.g. the combination of the arcuate flexible fuel pipes between the angled T connectors provide the pilot fuel manifold with this flexibility. A further advantage of the present disclosure is that in some arrangement the pilot fuel manifold and the additional fuel manifold are flexible and are able to accommodate differences in thermal expansion and contraction between the pilot fuel manifold and the additional fuel manifold and the annular combustion chamber casing. The pilot fuel manifold and the additional fuel manifold are flexible and are also able to accommodate vibration. The sinusoidal nature of the pilot fuel manifold, e.g. the combination of the arcuate flexible fuel pipes between the angled T connectors provide the pilot fuel manifold with this flexibility, and the sinusoidal nature of the additional fuel manifold, e.g. the combination of the arcuate flexible fuel pipes between the angled T connectors provide the additional fuel manifold with this flexibility.

A further advantage of the present disclosure is that rigid fuel supply pipes from the fuel manifold to the fuel injector of the previously discussed prior art have been dispensed with and hence the problem of cracking in these fuel supply pipes has been overcome. In addition the present disclosure has reduced the number of components, or parts, of the fuel manifold and fuel injector arrangement, and reduced the weight and cost of the fuel manifold and fuel injector arrangement. The number of brackets, clips, wear sleeves, bolts and washers has been reduced and in particular no brackets are required to support the flexible fuel pipes on the annular combustion chamber casing because each flexible fuel pipe is supported by two cross-piece connectors. The time for assembling the fuel manifold and fuel injector arrangement has been reduced and the time for disassembling and reassembling the fuel manifold and fuel injector arrangement for repairing or replacement of a fuel injector has also been reduced. The angling of the cross-piece enables the flexible fuel pipes to be more easily fitted onto and/or removed from the arms of the cross-piece connectors.

It may be possible to use flexible fuel pipes with different lengths if the circumferential spacing between the adjacent fuel injectors/apertures in the combustion chamber casing is not the same. The fuel pipes may be flexible along their full lengths or the mid-portions of the fuel pipes may be flexible.

The present disclosure is used with a main fuel manifold supplying the main fuel to the main fuel nozzle of lean burn fuel injectors, a pilot fuel manifold supplying the pilot fuel to the pilot fuel nozzle of lean burn fuel injectors and an additional manifold collecting fuel from the lean burn fuel injectors. The lean burn fuel injectors comprise a pilot fuel nozzle and a main fuel nozzle, for example a pilot fuel spray nozzle and a main fuel spray nozzle, a pilot fuel prefilmer and a main fuel prefilmer or a pilot fuel spray nozzle and a main fuel prefilmer.

Although the present disclosure has been described with reference to a turbofan gas turbine engine it may be equally applicable to other aircraft gas turbine engines, e.g. a turbojet gas turbine engine, a turboprop gas turbine engine or a turboshaft gas turbine engine. The present invention is equally applicable to marine, automotive and industrial gas turbine engine.

The invention claimed is:

1. A fuel manifold and fuel injector arrangement for supplying fuel to at least one combustion chamber, the fuel manifold and fuel injector arrangement comprising:

an annular combustion chamber casing arranged around the at least one combustion chamber;

a plurality of circumferentially spaced fuel injectors arranged to supply the fuel comprising at least one fuel into the at least one combustion chamber, each fuel injector of the plurality of circumferentially spaced fuel injectors having a main fuel nozzle and a pilot fuel nozzle;

a main fuel manifold arranged to supply a first fuel of the fuel to the main fuel nozzle of each fuel injector, the main fuel manifold including a plurality of flexible main fuel pipes;

at least one pilot fuel manifold arranged to supply a second fuel of the fuel to the pilot fuel nozzle of each fuel injector, each fuel injector having a fuel feed arm extending through a corresponding aperture in the annular combustion chamber casing;

a plurality of first connectors, each first connector including a stem and at least three arms, the stem of each first connector being mounted on an outer end of a respective one of the fuel feed arms, a first arm and a third arm of the at least three arms extending in opposite directions from the stem, and a second arm extending from the stem; and each flexible main fuel pipe interconnects the first arm of one first connector with the third arm of an adjacent first connector, each first connector configured to arrange the first arm and the third arm at an angle relative to a plane perpendicular to an axis of the annular combustion chamber casing, the main fuel manifold extending around the annular combustion chamber casing sinusoidally, and the second arm of each first connector is connected to the pilot fuel manifold.

2. The fuel manifold and fuel injector arrangement as claimed in claim 1, further comprising an additional fuel manifold configured to supply a third fuel of the fuel to the main fuel nozzle of each fuel injector, each first connector further comprising a fourth arm, the second arm and the fourth arm extending in opposite directions from the stem, and the fourth arm of each first connector being connected to the additional fuel manifold.

3. The fuel manifold and fuel injector arrangement as claimed in claim 1, wherein the first arm and the third arm of each first connecter are arranged (i) at an angle relative to a plane containing the axis of the annular combustion chamber casing, and (ii) at an angle relative to the plane perpendicular to the axis of the annular combustion chamber casing and the one first connecter, the adjacent first connector arranged at opposite angles such that the main fuel manifold extends around the combustion chamber casing sinusoidally.

4. The fuel manifold and fuel injector arrangement as claimed in claim 1, wherein the first arm and the third arm of each first connecter are arranged at an angle of 10° to 90° to the plane perpendicular to the axis of the annular combustion chamber casing.

5. The fuel manifold and fuel injector arrangement as claimed in claim 1, wherein the first arm and the third arm of each first connecter are arranged at an angle of 30° to 60° to the plane perpendicular to the axis of the annular combustion chamber casing.

6. The fuel manifold and fuel injector arrangement as claimed in claim 1, wherein all of the first connectors are configured to arrange the first arm and the third arm at an angle of the same magnitude.

7. The fuel manifold and fuel injector arrangement as claimed in claim 1, wherein each first connector is configured to arrange the first arm and the third arm at angles of different magnitudes.

8. The fuel manifold and fuel injector arrangement as claimed in claim 1, wherein each first connector is configured to arrange the first arm and the third arm at (i) an angle of 45° to a plane containing the axis of the annular combustion chamber casing, and (ii) at an angle of 45° to the plane perpendicular to the axis of the annular combustion chamber casing.

9. The fuel manifold and fuel injector arrangement as claimed in claim 1, wherein the first arm and the third arm of each first connector are parallel and arranged coaxially.

10. The fuel manifold and fuel injector arrangement as claimed in claim 1, wherein the pilot fuel manifold includes a plurality of flexible pilot fuel pipes and a plurality of second connectors, each second connector including a second stem, a fifth arm, and a sixth arm, the second stem of each second connector being connected to the second arm of a respective one of the first connectors, the fifth arm and the sixth arm extending in opposite directions from the second stem, and each flexible pilot fuel pipe interconnecting the fifth arm of one second connector with the sixth arm of an adjacent second connector.

11. The fuel manifold and fuel injector arrangement as claimed in claim 10, wherein each second connector is configured to arrange the fifth arm and the sixth arm at an angle relative to the plane perpendicular to the axis of the annular combustion chamber casing such that the pilot fuel manifold extends around the annular combustion chamber casing sinusoidally.

12. The fuel manifold and fuel injector arrangement as claimed in claim 2, wherein the additional fuel manifold includes a plurality of flexible additional fuel pipes and a plurality of third connectors, each third connector including a third stem, a seventh arm, and an eighth arm, the third stem of each third connector being connected to the fourth arm of a respective one of the first connectors, the seventh arm and the eighth arm extending in opposite directions from the third stem, and each flexible additional fuel pipe interconnecting the seventh arm of one third connector with the eighth arm of an adjacent third connector.

13. The fuel manifold and fuel injector arrangement as claimed in claim 12, wherein each third connector is configured to arrange the seventh arm and the eighth arm at an angle relative to the plane perpendicular to the axis of the annular combustion chamber casing such that the additional fuel manifold extends around the annular combustion chamber casing sinusoidally.

14. The fuel manifold and fuel injector arrangement as claimed in claim 1, wherein each first connector is a crosspiece connector.

15. The fuel manifold and fuel injector arrangement as claimed in claim 10, wherein each second connector is a T connector.

16. The fuel manifold and fuel injector arrangement as claimed in claim 12, wherein each third connector is a T connector.

17. The fuel manifold and fuel injector arrangement as claimed in claim 1, wherein the at least one combustion chamber is an annular combustion chamber.

18. The fuel manifold and fuel injector arrangement as claimed in claim 1, wherein the at least one combustion chamber is a gas turbine engine combustion chamber.

19. The fuel manifold and fuel injector arrangement as claimed in claim 18, wherein the gas turbine engine combustion chamber, being a part of a gas turbine engine, is selected from a group consisting of an aero gas turbine engine, a marine gas turbine engine, and an industrial gas turbine engine.

20. A fuel manifold and fuel injector arrangement for supplying fuel to at least one combustion chamber, the fuel manifold and fuel injector arrangement comprising:
- an annular combustion chamber casing arranged around the at least one combustion chamber;
- a plurality of circumferentially spaced fuel injectors arranged to supply the fuel comprising at least one fuel into the at least one combustion chamber, each fuel injector of the plurality of circumferentially spaced fuel injectors having a main fuel nozzle and a pilot fuel nozzle;
- a main fuel manifold arranged to supply a main fuel of the fuel to the main fuel nozzle of each fuel injector, the main fuel manifold including a plurality of flexible main fuel pipes;
- at least one pilot fuel manifold arranged to supply a pilot fuel of the fuel to the pilot fuel nozzle of each fuel injector;
- an additional fuel manifold arranged to supply the main fuel of the fuel to the main fuel nozzle of each fuel injector, each fuel injector having a fuel feed arm extending through a corresponding aperture in the annular combustion chamber;
- a plurality of cross-piece connectors, each cross-piece connector comprising a stem and four arms, the stem of each cross-piece connector being mounted on an outer end of a respective one of the fuel feed arms, a first arm and a third arm extending in opposite directions from the stem, a second arm and a fourth arm extending in opposite directions from the stem; and
- each flexible main fuel pipe interconnects the first arm of one cross-piece connector with the third arm of an adjacent cross-piece connector, each cross-piece connector configured to arrange the first arm and the third arm at an angle relative to a plane perpendicular to an axis of the annular combustion chamber casing such that the main fuel manifold extends around the annular combustion chamber casing sinusoidally, the second arm of each cross-piece connector is connected to the pilot fuel manifold, and the fourth arm of each cross-piece connector is connected to the additional fuel manifold.

21. A fuel manifold and fuel injector arrangement for supplying fuel to at least one combustion chamber, the fuel manifold and fuel injector arrangement comprising:
- an annular combustion chamber casing arranged around the at least one combustion chamber;
- a plurality of circumferentially spaced fuel injectors arranged to supply the fuel comprising at least one fuel into the at least one combustion chamber, each fuel injector of the plurality of circumferentially spaced fuel injectors having a main fuel nozzle and a pilot fuel nozzle;
- a main fuel manifold arranged to supply a first fuel of the fuel to the main fuel nozzle of each fuel injector, the main fuel manifold comprising a plurality of flexible main fuel pipes;
- at least one pilot fuel manifold arranged to supply a second fuel of the fuel to the pilot fuel nozzle of each fuel injector, each fuel injector having a fuel feed arm extending through a corresponding aperture in the annular combustion chamber casing;
- a plurality of cross-piece connectors, each cross-piece connector comprising a stem and three arms, the stem of each cross-piece connector being mounted on an outer end of a respective one of the fuel feed arms, a first arm and a third arm extending in opposite directions from the stem, a second arm extending from the stem; and
- each flexible main fuel pipe interconnects the first arm of one cross-piece connector with the third arm of an adjacent cross-piece connector, each cross-piece connector being arranged such that the first arm and the third arm are arranged at an angle relative to a plane perpendicular to an axis of the annular combustion chamber casing such that the main fuel manifold extends around the annular combustion chamber casing sinusoidally, and the second arm of each cross-piece connector is connected to the pilot fuel manifold.

\* \* \* \* \*